United States Patent
Jain (10) Patent No.: US 6,480,853 B1
(45) Date of Patent: Nov. 12, 2002

(54) SYSTEMS, METHODS AND COMPUTER PROGRAM PRODUCTS FOR PERFORMING INTERNET SEARCHES UTILIZING BOOKMARKS

(75) Inventor: Anuj Kumar Jain, Raleigh, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/264,344

(22) Filed: Mar. 8, 1999

(51) Int. Cl.$^7$ .............................................. G06F 17/30
(52) U.S. Cl. ............................ 707/10; 707/102; 707/5; 709/225
(58) Field of Search ............................ 707/10, 5, 3, 4, 707/100, 102, 500, 501.1; 345/357; 709/225

(56) References Cited

U.S. PATENT DOCUMENTS

| | | | |
|---|---|---|---|
| 5,761,662 A | | 6/1998 | Dasan .......................... 707/10 |
| 5,813,007 A | | 9/1998 | Nielsen ........................ 707/10 |
| 6,006,225 A | * | 12/1999 | Bowman et al. ............... 707/5 |
| 6,100,890 A | * | 8/2000 | Bates et al. .................. 345/357 |
| 6,121,522 A | * | 9/2000 | Desbons ................... 800/320.1 |
| 6,138,158 A | * | 10/2000 | Boyle et al. ................. 709/225 |
| 6,209,036 B1 | * | 3/2001 | Aldred et al. ................ 709/229 |
| 6,211,871 B1 | * | 4/2001 | Himmel et al. .............. 345/335 |
| 6,223,178 B1 | * | 4/2001 | Himmel et al. ................ 707/10 |
| 6,286,046 B1 | * | 9/2001 | Bryant ........................ 709/225 |

OTHER PUBLICATIONS

Persistent Client State HTTP Cookies, http://www.netscape.com/newsref/std/cookie_spec.html.

MIME (Multipurpose Internet Mail Extensions) Part One: Mechanisms for Specifying and Describing the Format of Internet Message Bodies, Network Working Group, Request for Comments: 1521 (Sep. 1993) http://www.tac.nyc.ny.us/~kim/mime/1521/rfc1521ToC.html.

MIME (Multipurpose Internet Mail Extensions) Part Two: Message Header Extensions for Non–ASCH Text, Network Working Group, Request for Comments: 1522 (Sep. 1993), http://www.tac.nyc.ny.us/~kim/mime/1522/rfc1522ToC.html.

Kosmynin, "From Bookmark Managers to Distributed Indexing: An Evolutionary Way to the Next Generation of Search Engines," IEEE Communications Magazine, pp. 146–151 (Jun. 1997).

Abrams et al., "Information Archiving with Bookmarks: Personal Web Space Construction and Organization," Chi Conf. Proceedings, Human Factors in Computing Systems, NY, NY, pp. 41–48 (1998).

PCT International Search Report, International Application No. PCT/US99/30586, mailed May 25, 2000.

* cited by examiner

Primary Examiner—Jean M. Corrielus
Assistant Examiner—Tam Nguyen
(74) Attorney, Agent, or Firm—Myers Bigel Sibley & Sajovec (57) ABSTRACT

Systems, methods and computer program products are provided for allowing a Web server search engine to search a user's bookmarks stored within the user's browser on a client device. A user's search request to a search engine is accompanied by a list of bookmarks stored within the user's browser. A search engine receiving the search request and accompanying list of bookmarks initially searches the list of bookmarks for URLs that satisfy the search request. Each of the user's bookmarks that satisfies the search request is then displayed within the user's browser. The search engine can then search the Internet for Web pages (or other files) that satisfy the search request.

42 Claims, 5 Drawing Sheets

SYSTEMS, METHODS AND COMPUTER PROGRAM PRODUCTS FOR PERFORMING INTERNET SEARCHES UTILIZING BOOKMARKS

FIELD OF THE INVENTION

The present invention relates generally to information searching and, more particularly, to information searching on the Internet.

BACKGROUND OF THE INVENTION

The Internet is a worldwide decentralized network of computers having the ability to communicate with each other. The Internet has gained broad recognition as a viable medium for communicating and interacting across multiple networks. The World-Wide Web (Web) was created in the early 1990's and is comprised of server-hosting computers (Web servers) connected to the Internet that have hypertext documents or Web pages stored therewithin. Web pages are accessible by client programs (i.e., Web browsers) utilizing the Hypertext Transfer Protocol (HTTP) via a Transmission Control Protocol/Internet Protocol (TCP/IP) connection between a client-hosting device and a server-hosting device. While HTTP and hypertext documents are the prevalent forms for the Web, the Web itself refers to a wide range of protocols including Secure Hypertext Transfer Protocol (HTTPS), File Transfer Protocol (FTP), and Gopher, and content formats including plain text, Extensible Markup Language (XML), as well as image formats such as Graphics Interchange Format (GIF) and Joint Photographic Experts Group (JPEG).

Specific to the Web, a Web server is a computer program (housed in a computer) that serves requested Web pages and files. A Web client is a requesting program associated with a user. A Web browser is an exemplary Web client for use in requesting Web pages and files from Web servers.

A Web site is conventionally a collection of Web pages and files related to a particular subject that includes a beginning file called a home page. A large Web site may reside on a number of geographically-dispersed Web servers. The Web site of Ericsson, Inc. (www.ericsson.com), for example, consists of thousands of Web pages and files spread out over various Web servers in locations worldwide.

An intranet can be a private computer network that is conventionally contained within an enterprise and that conventionally includes one or more servers in communication with multiple user computers. An intranet may include interlinked local area networks and may also use leased-lines in a wide-area network. An intranet may or may not include connections to the outside Internet. Intranets conventionally utilize various Internet protocols and, in general, often look like private versions of the Internet. An intranet user conventionally accesses an intranet server via a Web browser running locally on his/her computer (i.e., intranet client device).

Exemplary Web browsers for both Internet and intranet use include Netscape Navigator® (Netscape Communications Corporation, Mountain View, Calif.) and Internet Explorer® (Microsoft Corporation, Redmond, Wash.). Web browsers typically provide a graphical user interface for retrieving and viewing information, applications and other resources hosted by Internet/intranet servers (hereinafter collectively referred to as "Web servers").

Web content including, but not limited to, information, applications, applets and other video and audio resources (collectively referred to herein as "files") are conventionally delivered from a Web server to a Web browser on a user's computer in the form of Web pages. As is known to those skilled in this art, a Web page is conventionally formatted via a standard page description language such as HyperText Markup Language (HTML), and typically displays text and graphics, and can play sound, animation, and video data. HTML provides basic document formatting and allows a Web content provider to specify hypertext links (typically manifested as highlighted text) to other servers and files. When a user selects a particular hypertext link, a Web browser reads and interprets the address, called a Uniform Resource Locator (URL) associated with the link, connects the Web browser with the Web server at that address, and makes an HTTP request for the file identified in the link. The web server then sends the requested file to the client in HTML format which the browser interprets and displays to the user.

Conventional Web browsers typically provide a "bookmark" function that allows users to store the URLs of selected Web pages. A bookmark (referred to as a "favorite" by Microsoft's Internet Explorer Web browser) can simplify future access to a Web page associated with the bookmark. For frequently visited Web sites, bookmarks can expedite the process of accessing Web pages. For a typical user, a list of bookmarks can become quite large. Furthermore, a user may forget what is contained within a particular bookmarked Web page, or may forget the significance of the bookmark.

Figure 1:
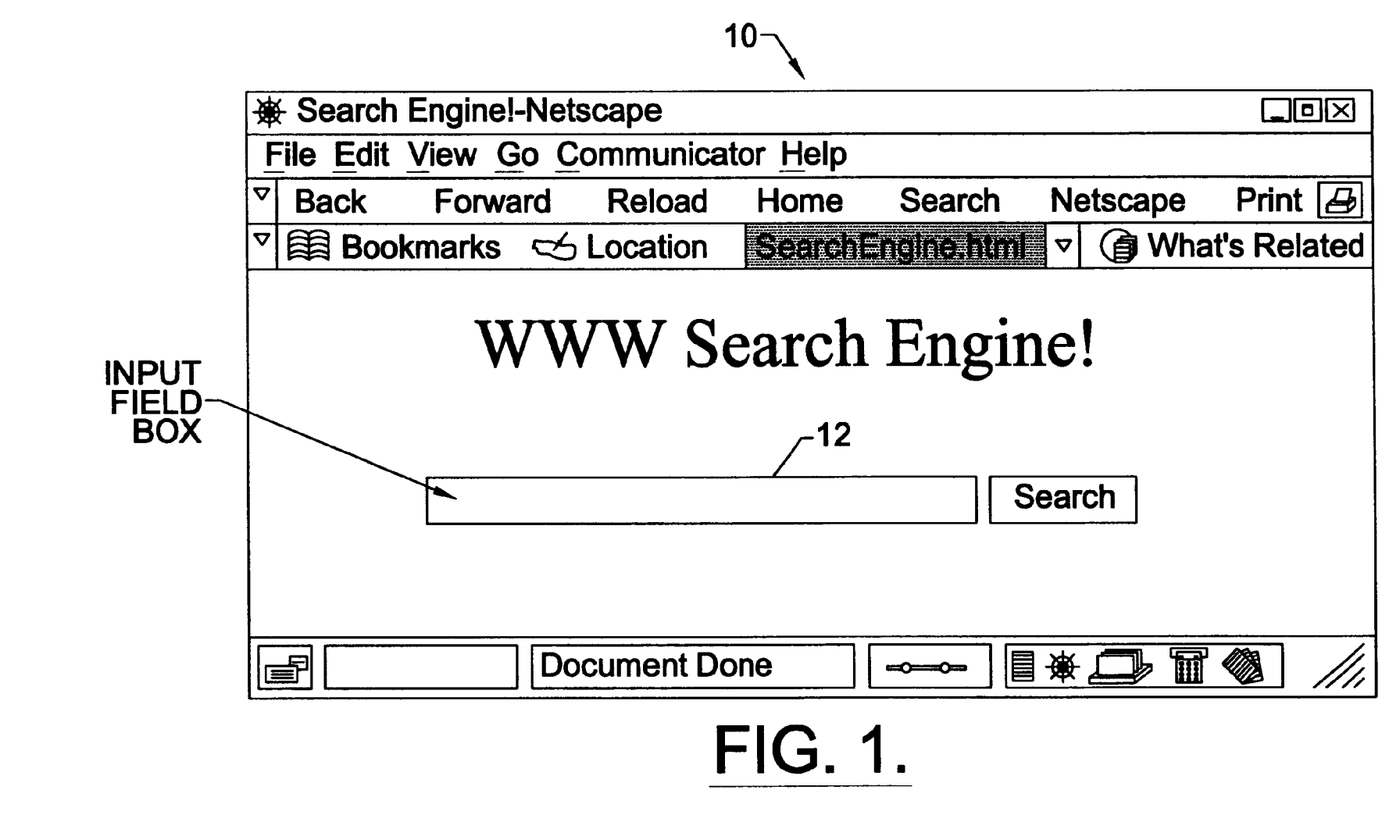
FIG. 1 illustrates a conventional search entry form in which a user can input keywords and phrases to be searched by a search engine.

To locate information on the Web (or on an intranet) users often utilize a search engine. Search engines are configured to take keywords and phrases provided by a usersand locate various Web pages containing these keywords and phrases. FIG. 1 illustrates a conventional search entry form 10 containing a box 12 in which a user can input keywords and phrases to be searched by a search engine.

Typically, a search engine utilizes a spider (also called a "crawler" or a "bot") that visits Web pages on Web sites that want to be searchable. A spider will then read each Web page and will use hypertext links on a Web page to discover and read Web pages at other Web sites. Information read by a spider is then used to generate an index (sometimes called a "catalog") from the Web pages that have been read. Most of the major search engines (i.e., Lycos, HotBot, Alta Vista) attempt to do something close to indexing the entire content of the Web (or an intranet).

Notwithstanding the above, there continues to be a need for improved searching of the Web (or an intranet.

SUMMARY OF THE INVENTION

In view of the above discussion, it is an object of the present invention to enhance searching for information on the Internet.

This and other objects of the present invention are provided by systems, methods and computer program products for allowing a Web server search engine to search a user's bookmarks stored within the user's browser on a client device. A user's search request to a search engine is accompanied by a list of bookmarks stored within the user's browser. The list of bookmarks can be sent to the search engine with the search request either as a cookie or as a Multi-Purpose Internet Mail Extension (MIME) attachment, or by other techniques.

The invention stems from the realization that, typically, a user will conduct a search of the Web (or of an intranet) for a particular subject matter (or for a particular Web site) via a search engine even though the user may have relevant URLs stored as bookmarks within his or her browser. It may be difficult for a user to remember what he or she has bookmarked, especially for large numbers of stored bookmarks. Bookmarks can be a valuable resource to a user. Unfortunately, bookmarks often become overlooked by a user searching for information on the Internet.

A search engine receiving a search request and accompanying list of bookmarks initially searches the list of bookmarks for URLs that satisfy the search request. Each of the user's bookmarks that satisfies the search request is then displayed within the user's browser. The search engine can then search the Internet for Web pages (or other files) that also satisfy the search request. The results from this search may also be displayed within the user's browser. Accordingly, the present invention can help save both user time as well as sever processing time by performing searches of a user's stored bookmarks before a search of Internet resources is conducted.

DETAILED DESCRIPTION OF THE INVENTION

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention is preferably practiced within a client/server programming environment. As is known by those skilled in this art, client/server is a model for a relationship between two computer programs in which one program, the client, makes a service request from another program, the server, which fulfills the request. Although the client/server model can be used by programs within a single computer, it is more commonly used in a network where computing functions and data can more efficiently be distributed among many client and server programs at different network locations.

Many business applications being written today use the client/server model as does the Internet's main program, TCP/IP (Transmission Control Protocol/Internet Protocol). Typically, multiple client programs share the services of a common server program.

Both client programs and server programs are often part of a larger program or application. Relative to the Internet, a Web browser is a client program that requests services (the sending of Web pages or files) from a Web server (which technically is called a Hypertext Transport Protocol or HTTP server) in another computer somewhere on the Internet. Similarly, a computer with TCP/IP installed allows client requests for files from File Transfer Protocol (FTP) servers in other computers on the Internet.

As is known to those with skill in this art, client/server environments may include public computer networks, such as the Internet, and private computer networks often referred to as "Intranets" and "Extranets." The term "Internet" shall incorporate the terms "Intranet" and "Extranet" and any references to accessing the Internet shall be understood to mean accessing an Intranet and/or and Extranet, as well. The term "computer network" shall incorporate publicly accessible computer networks (i.e., the Internet) and private computer networks (i.e., intranets and extranets).

Figure 2:
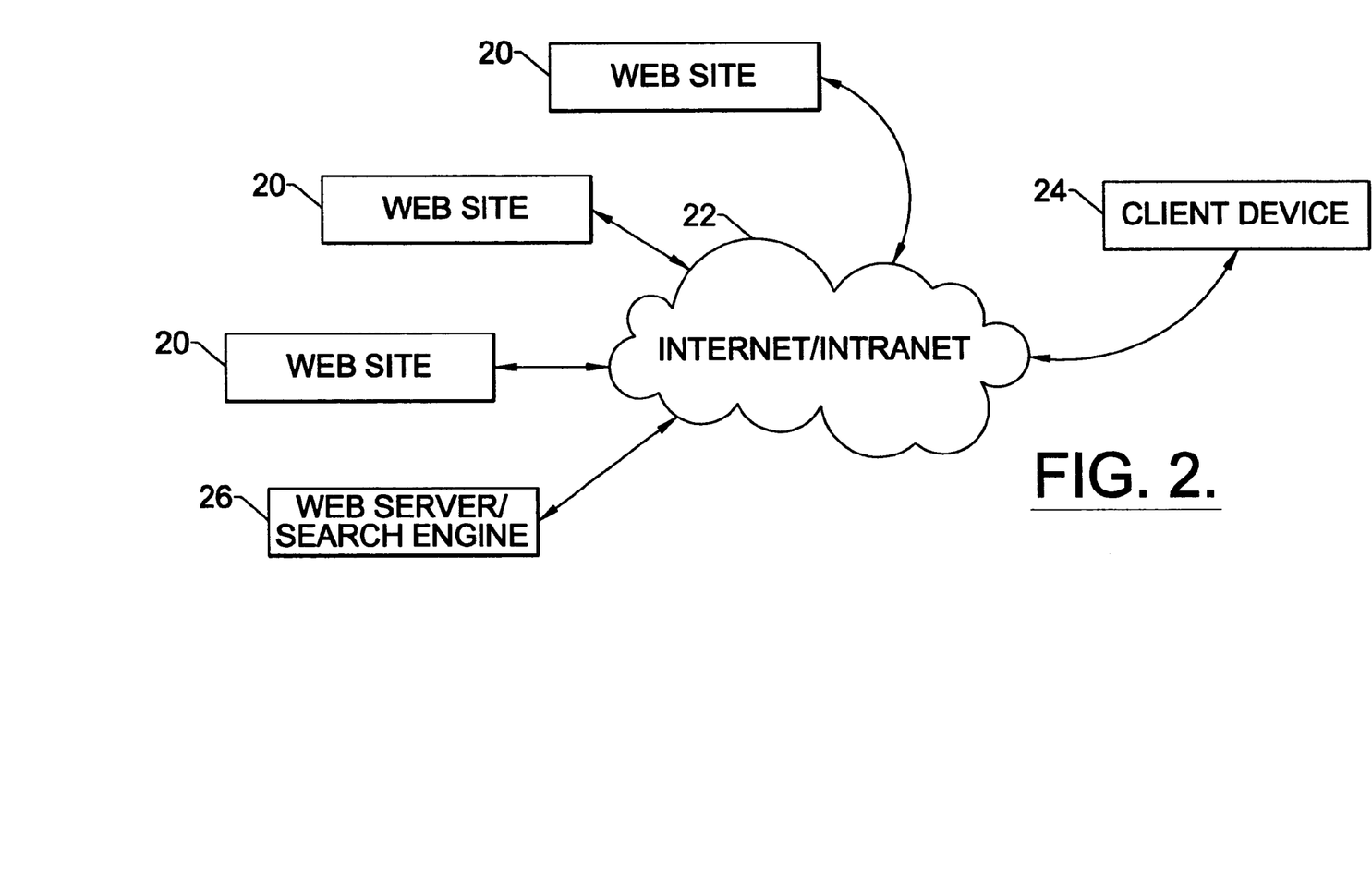
FIG. 2 schematically illustrates a client/server computing system in which the present invention may be embodied.

FIG. 2 illustrates a client/server computing system in which the present invention may be embodied. A plurality of Web sites 20 containing Web pages or other files are connected to a computer network 22, such as the Internet. A client device 24 is configured to communicate with, and receive Web pages (or other files) from each of the Web sites 20 via the Internet 22. A server device 26 hosting a search engine is configured to receive search requests from the client device 24 and to locate Web pages (or other files) within the computer network 22 that satisfy the search request. In addition, as will be described in detail below, the search engine is also configured to search a user's list of bookmarked URLs stored within the client device 24.

Exemplary client devices may include personal computers as well as telecommunications devices, such as radiotelephones. As is known by those skilled in the art, radiotelephones generally refer to communications terminals which can provide a wireless communications link to one or more other communications terminals. Radiotelephones may be used in a variety of different applications, including cellular telephone, land-mobile (e.g., police and fire departments), and satellite communications systems.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, or magnetic storage devices.

Computer program code for carrying out operations of the present invention is preferably written in an object oriented programming language such as JAVA®, Smalltalk or C++. However, the computer program code for carrying out operations of the present invention may also be written in conventional procedural programming languages, such as the "C" programming language, or in a functional (or fourth generation) programming language such as Lisp, SML, or Forth. The program code may execute entirely on a Web server hosting a search engine, or it may execute partly on a Web server and partly on a remote computer (i.e., a user's client device). In the latter scenario, the remote computer may be connected to the Web server through a LAN or a WAN, or the connection may be made to an external computer (for example, through the Internet using an Internet Service Provider).

The present invention is described below with reference to flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Figure 3:
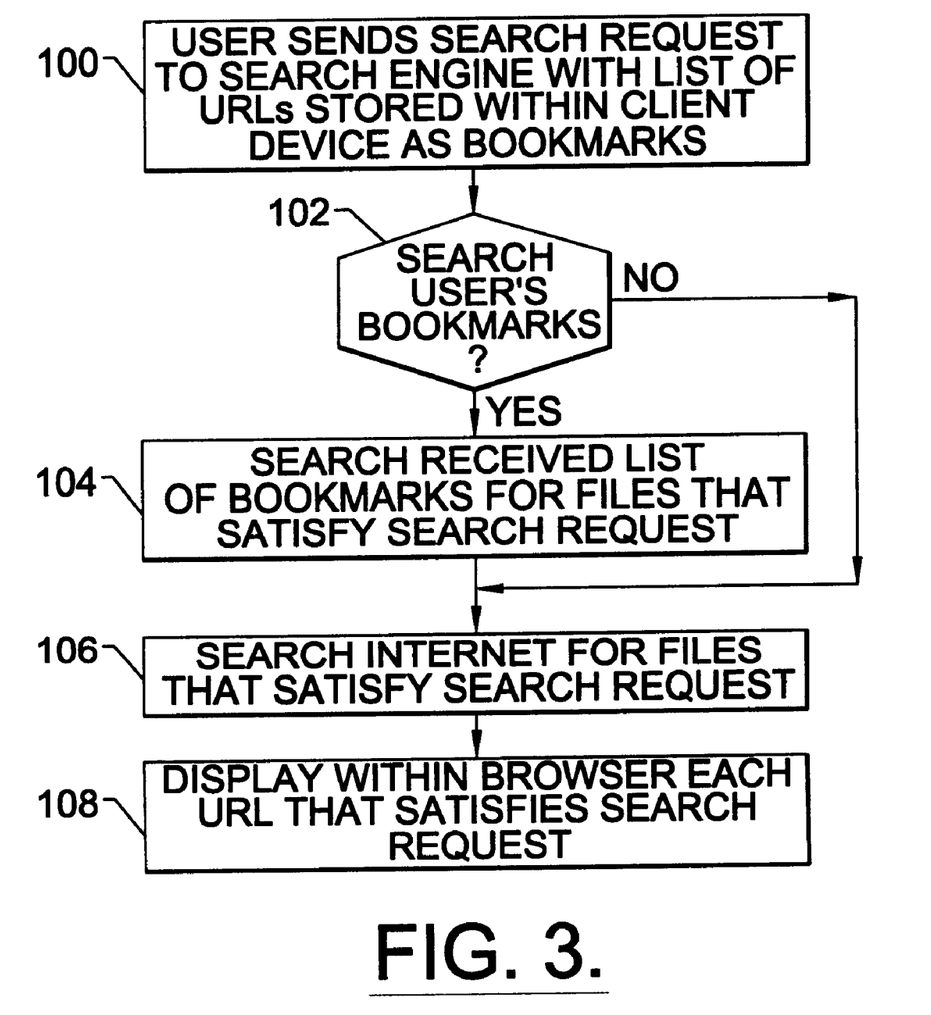
FIG. 3 schematically illustrates operations for searching a computer network (e.g., the Internet or an intranet) for files, such as Web pages, according to one embodiment of the present invention.

Referring now to FIG. 3, operations for searching a computer network (e.g., the Internet or an intranet) for files, such as Web pages, according to one aspect of the present invention, are illustrated. Initially, a user sends a search request via a browser executing on a client device to a search engine executing on a server device along with a list of bookmarked URLs attached to the search request (Block 100). For example, a user may want a search conducted for Web pages related to "cellular telephones." Accordingly, the user would type in the phrase "cellular telephone" within a search engine form, such as that illustrated in FIG. 1.

Figure 4:
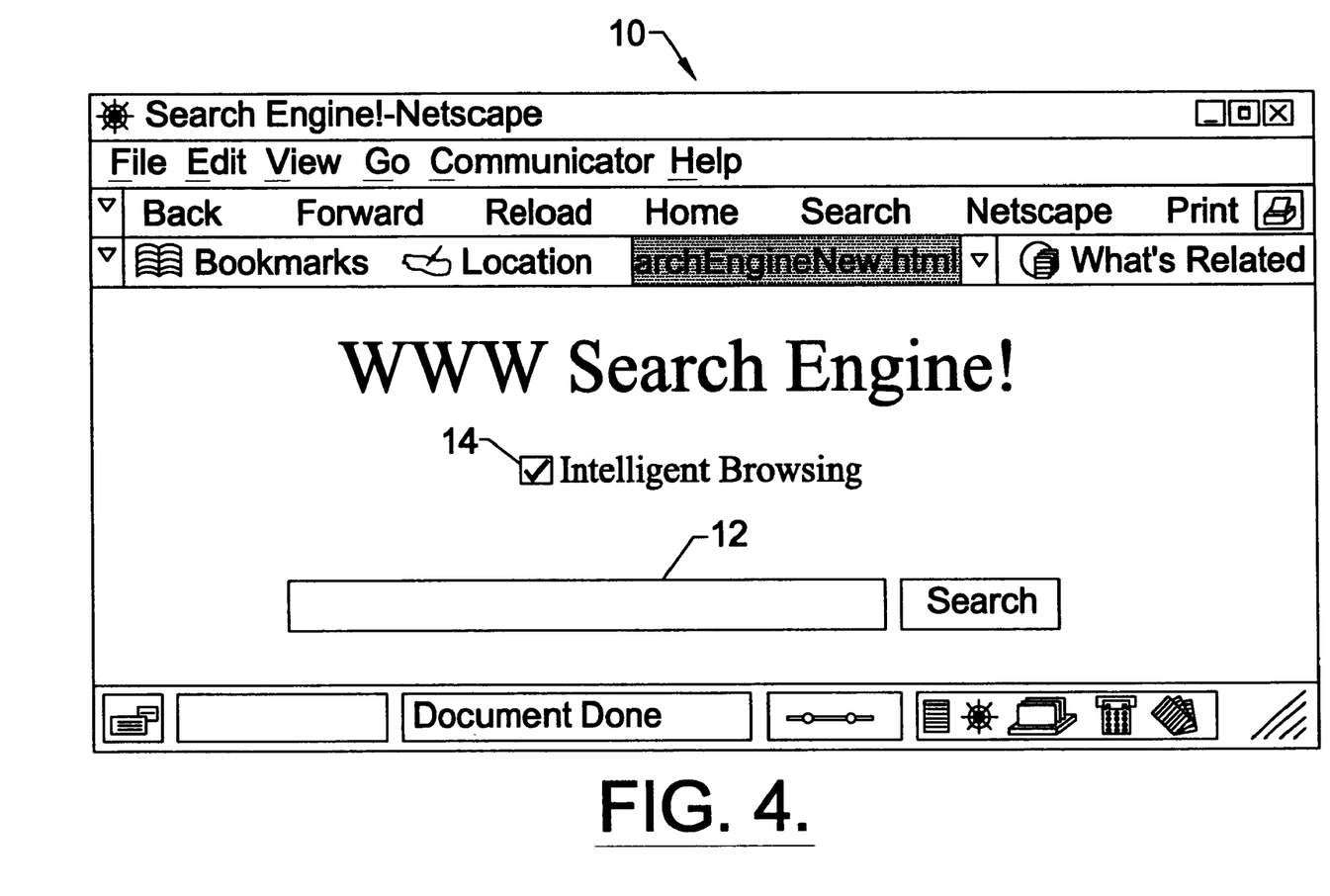
FIG. 4 illustrates a search entry form that contains a check box that can be used to invoke searching of a user's bookmarks according to the present invention.

A determination is made at the search engine whether the user wants his or her bookmarks to be searched in conjunction with the received search request (Block 102). As illustrated in FIG. 4, the step represented by Block 102 may be performed by determining whether the user has checked a box (or made some other indication), thereby invoking the search of the user's bookmarks. The illustrated search form 10 in FIG. 3 includes a check box 14. When the check box 14 is "checked" the user wants the search engine to search the user's bookmarks. When the check box 14 is not "checked", the user does not want the search engine to search the user's bookmarks.

If a user wants his or her bookmarks to be searched, the search engine searches the received list of bookmarked URLs for Web pages (or other files) identified by each respective URL that satisfy the search request (Block 104). For example, if the search term was "cellular telephones", the search engine would search the received list of user bookmarks first for Web pages related to cellular telephones.

Next, or if the user did not want his or her bookmarks to be searched (Block 102), the search engine conducts a search of the Internet for Web pages (or other files) that are related to cellular telephones (Block 106). The URLs of Web pages (or other files) that satisfy the search request are then displayed to the user via the user's browser (Block 108).

Preferably, a user sends a list of his or her bookmarks to a search engine as a cookie or as a Multi-Purpose Internet Mail Extension (MIME) attachment. As is known to those skilled in the art, a cookie is a special text file that a server (e.g., a Web server) places on a client device (i.e., on the hard disk of the client device) so that the server can remember something about the user at a later time. Typically, a cookie records a user's preferences when using a particular site.

As is known to those skilled in the art, each HTTP request for a Web page is generally independent of other requests. Accordingly, a server typically has no memory of a user's previous visits to a Web site or what Web pages the server has previously sent to a client. A cookie is a mechanism that allows a server to store its own file about a user on the user's own client device. The file is typically stored in a subdirectory of the browser directory (for example, as a subdirectory under the Netscape directory). A cookie subdirectory will typically contain a cookie file for each Web site a user has accessed that utilizes cookies. Cookies are described in detail in "Persistent Client State HTTP Cookies", Netscape Communications Corporation, Mountain View, Calif., (www.netscape.com/newsref/std/cookie_spec.html), 1999, which is incorporated herein by reference in its entirety.

Each bookmark in a user's list of bookmarks may also be accompanied by additional information that is searchable by a search engine. Keywords or phrases can be included with a URL if the title of the URL is not descriptive enough by itself. For example, the bookmark (http://www.ericsson.com/tel/123/abc.html) may not be descriptive of content contained therewithin. Accordingly, additional searchable information may be provided to a search engine along with a bookmarked URL.

According to one embodiment of the present invention, a user's browser can be configured to store user bookmarks as a cookie for a particular server hosting a search engine. For example, if a user utilizes the HotBot search engine (www.hotbot.com), the user's browser could create a cookie for the server located at www.hotbot.com that lists the user's bookmarks. Alternatively, a cookie could be generated when a search request is made by a user (i.e., at runtime) and the user decides to allow a search engine to search the user's bookmarks. When a search engine receives a cookie from a user's browser, the search engine is configured to interpret the cookie and search the bookmarks contained therewithin.

As is known to those skilled in the art, a MIME attachment is an extension of the original Internet e-mail protocol that lets users exchange different kinds of data files on the Internet such as audio, video, images, and application programs. MIME attachments are described in detail in "MIME (Multipurpose Internet Mail Extensions) Part One: Mechanisms for Specifying and Describing the Format of Internet Message Bodies", Network Working Group Request for Comments: 1521, September, 1993, (www.tac.nvc.nv.us/~ kim/mime/1521/rfc1521ToC.html) and "MIME (Multipurpose Internet Mail Extensions) Part Two: Message Header Extensions for Non-ASCII Text", Network Working Group Request for Comments: 1522, September, 1993, (www.tac.nvc.ny.us/~ kim/mime/1522/rfc1522ToC.html), which are incorporated herein by reference in their entirety.

As is known to those skilled in the art, servers insert a MIME header at the beginning of any Web transmission. Clients use this header to select an appropriate "player"

application for the type of data the header indicates. Some of these players are typically built into the Web browser (for example, most browsers come with GIF and JPEG image players as well as the ability to handle HTML files). Other players may need to be downloaded.

According to one embodiment of the present invention, a user's browser can be configured to provide bookmark information as a MIME attachment to an HTTP request to a search engine. When a search engine receives a MIME attachment with an HTTP request from a user's browser, the search engine is configured to interpret the MIME attachment and search the bookmarks contained therewithin.

Figure 5:
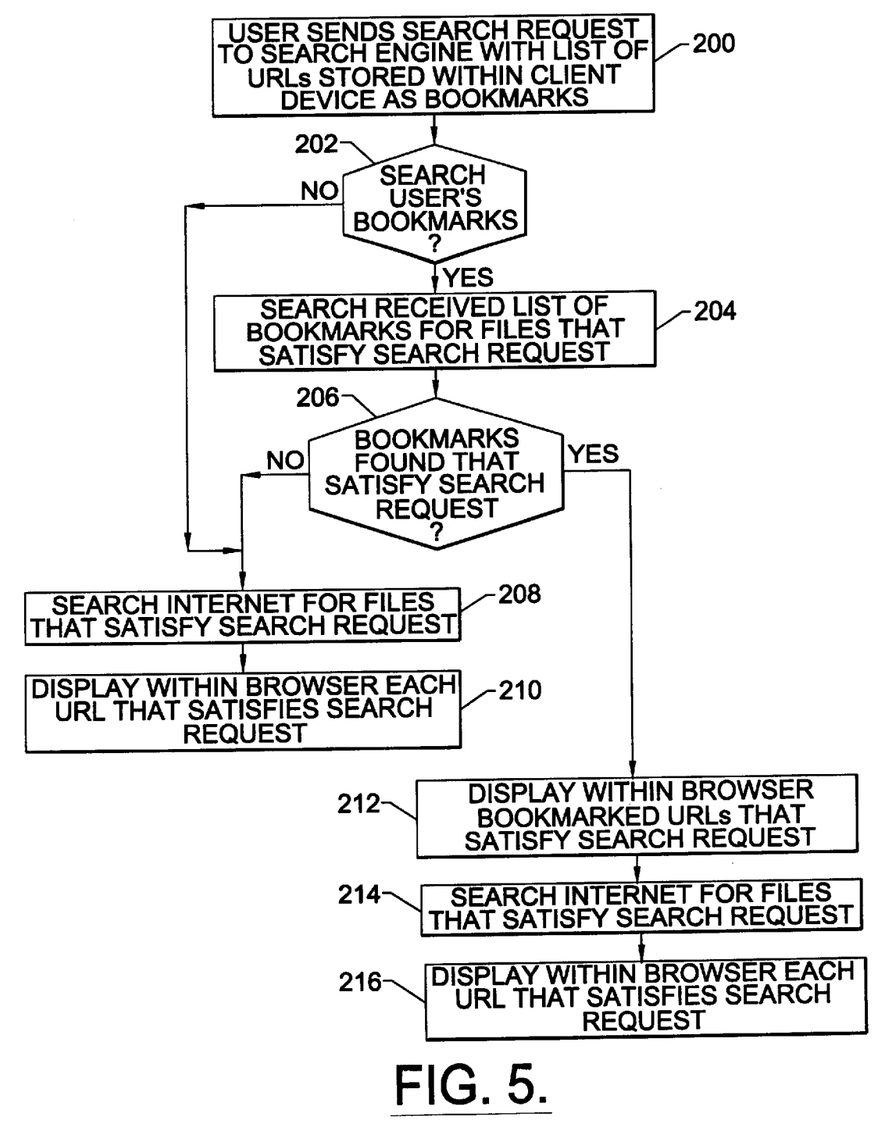
FIG. 5 schematically illustrates operations for searching a computer network (e.g., the Internet or an intranet) for files, such as Web pages, according to another embodiment of the present invention.

Referring now to FIG. 5, operations for searching a computer network (e.g., the Internet or an intranet) for files, such as Web pages, according to another embodiment of the present invention is illustrated. Initially, a user sends a search request via a browser executing on a client device to a search engine executing on a server device along with a list of bookmarked URLs attached to the search request (Block 200). A determination is made at the search engine whether the user wants his or her bookmarks to be searched in conjunction with the received search request (Block 202). If a user wants his or her bookmarks to be searched, the search engine searches the received list of bookmarked URLs for Web pages (or other files) identified by each respective URL that satisfy the search request (Block 204).

If any of the user's bookmarks are found to satisfy the user's search request (Block 206), the bookmarks that satisfy the search request are displayed within the user's browser (Block 212). Next, the search engine conducts a search of the Internet for Web pages (or other files) that satisfy the search request (Block 214). The URLs of Web pages (or other files) that satisfy the search request are then displayed to the user, along with the user's bookmarks that satisfy the search request, via the user's browser (Block 216).

If none of the user's bookmarks are found to satisfy the user's search request (Block 206), the search engine conducts a search of the Internet for Web pages (or other files) that are related to the search request (Block 208). The URLs of Web pages (or other files) that satisfy the search request are then displayed to the user via the user's browser (Block 210).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clause are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of searching a computer network for files, wherein files in the computer network are identified by respective Universal Resource Locators (URLs), the method comprising the steps of:

sending a search request from a browser application executing on a client device to a server application executing on a server device, wherein the server application is configured to perform a search of computer network files satisfying search requests from client devices, wherein the browser application includes a bookmark mechanism for storing URLs of selected files on the computer network, and wherein the search request is accompanied by a list of URLs stored within the browser application bookmark mechanism and at least one search tern;

searching the received list of URLs stored in the client device bookmark mechanism for files in the computer network that satisfy the search request; and displaying each URL stored in the client device bookmark mechanism that satisfies the search request within the browser application.

2. A method according to claim 1 further comprising the steps of:

searching for computer network files that satisfy the search request; and displaying each URL that satisfies the search request within the browser application.

3. A method according to claim 1 wherein each URL in the list of URLs transmitted with the search request is accompanied by information about a file identified thereby.

4. A method according to claim 1 wherein the list of URLs store d within the client device bookmark mechanism is transmitted with the search request as a cookie.

5. A method according to claim 1 wherein the list of URLs stored within the client device bookmark mechanism is transmitted with the search request as a Multipurpose Internet Mail Extension (MIME) attachment.

6. A method according to claim 1 wherein the client device is configured to communicate with the server application via wireless communication signals transmitted and received to and from the computer network.

7. A method according to claim 1 wherein the client device is a radiotelephone.

8. A method according to claim 1 wherein the server application is a search engine.

9. A method of searching the Internet for Web pages, wherein each Web page is identified by a respective Universal Resource Locator (URL), the method comprising the steps of:

sending a search request from a browser application executing on a client device to a search engine executing on a server device, wherein the search engine is configured to perform a search for Web pages that satisfy search requests from client devices, wherein the browser application includes a bookmark mechanism for storing URLs of selected Web pages on the Internet, and wherein the search request is accompanied by a list of URLs stored within the browser application bookmark mechanism and at least one search term;

searching the received list of URLs stored in the client device bookmark mechanism for Web pages that satisfy the search request;

searching the Internet for Web pages that satisfy the search request; and displaying within the browser application URLs from the list of URLs stored in the client device bookmark mechanism and from Web pages that satisfy the search request.

10. A method according to claim 9 wherein each URL in the list of URLs transmitted with the search request is accompanied by information about a file identified thereby.

11. A method according to claim 9 wherein the list of URLs stored within the client device bookmark mechanism is transmitted with the search request as a cookie.

12. A method according to claim 9 wherein the list of URLs stored within the client device bookmark mechanism is transmitted with the search request as a Multipurpose Internet Mail Extension (MIME) attachment.

13. A method according to claim 9 wherein the client device is configured to communicate with the search engine via wireless communication signals transmitted and received to and from the computer network.

14. A method according to claim 9 wherein the client device is a radiotelephone.

15. A system for searching a computer network for files, wherein files in the computer network are identified by respective Universal Resource Locators (URLs), comprising:
- a client device having a browser application executing thereon, wherein the browser application includes a bookmark mechanism for storing URLs of selected files on the computer network;
- a server device having a server application executing thereon, wherein the server application is configured to perform a search of computer network files satisfying search requests from client devices;
- means for sending a search request from the browser application to the server application, wherein the search request is accompanied by a list of URLs stored within the browser application bookmark mechanism and at least one search term;
- means for searching the received list of URLs stored in the client device bookmark mechanism for files in the computer network that satisfy the search request; and
- means for displaying each URL stored in the client device bookmark mechanism that satisfies the search request within the browser application.

16. A system according to claim 15 further comprising:
- means for searching for computer network files that satisfy the search request; and
- means for displaying each URL that satisfies the search request within the browser application.

17. A system according to claim 15 wherein each URL in the list of URLs transmitted with the search request is accompanied by information about a file identified thereby.

18. A system according to claim 15 wherein the list of URLs stored within the client device bookmark mechanism is transmitted with the search request as a cookie.

19. A system according to claim 15 wherein the list of URLs stored within the client device bookmark mechanism is transmitted with the search request as a Multipurpose Internet Mail Extension (MIME) attachment.

20. A system according to claim 15 wherein the client device is configured to communicate with the server application via wireless communication signals transmitted and received to and from the computer network.

21. A system according to claim 15 wherein the client device is a radiotelephone.

22. A system according to claim 15 wherein the server application is a search engine.

23. A system for searching the Internet for Web pages, wherein each Web page is identified by a respective Universal Resource Locator (URL), comprising:
- a client device having a browser application executing thereon, wherein the browser application includes a bookmark mechanism for storing URLs of selected files on the computer network;
- a server device having a search engine executing thereon, wherein the search engine is configured to perform a search of computer network files satisfying search requests from client devices;
- means for sending a search request from the browser application to the search engine, wherein the search request is accompanied by a list of URLs stored within the browser application bookmark mechanism and at least one search term;
- means for searching the received list of URLs stored in the client device bookmark mechanism for Web pages that satisfy the search request;
- means for searching the Internet for Web pages that satisfy the search request; and
- means for displaying within the browser application URLs from the list of URLs stored in the client device bookmark mechanism and from Web pages that satisfy the search request.

24. A system according to claim 23 wherein each URL in the list of URLs transmitted with the search request is accompanied by information about a file identified thereby.

25. A system according to claim 23 wherein the list of URLs stored within the client device bookmark mechanism is transmitted with the search request as a cookie.

26. A system according to claim 23 wherein the list of URLs stored within the client device bookmark mechanism is transmitted with the search request as a Multipurpose Internet Mail Extension (MIME) attachment.

27. A system according to claim 23 wherein the client device is configured to communicate with the search engine via wireless communication signals transmitted and received to and from the computer network.

28. A system according to claim 23 wherein the client device is a radiotelephone.

29. A computer program product for searching a computer network for files, wherein files in the computer network are identified by respective Universal Resource Locators (URLs), the computer program product comprising a computer usable storage medium having computer readable program code means embodied in the medium, the computer readable program code means comprising:
- computer readable program code means for sending a search request from a browser application executing on a client device to a server application executing on a server device, wherein the server application is configured to perform a search of computer network files satisfying search requests from client devices, wherein the browser application includes a bookmark mechanism for storing URLs of selected files on the computer network, and wherein the search request is accompanied by a list of URLs stored within the browser application bookmark mechanism and at least one search term;
- computer readable program code means for searching the received list of URLs stored in the client device bookmark mechanism for files in the computer network that satisfy the search request; and
- computer readable program code means for displaying each URL stored in the client device bookmark mechanism that satisfies the search request within the browser application.

30. A computer program product according to claim 29 further comprising:
- computer readable program code means for searching for computer network files that satisfy the search request; and computer readable program code means for displaying each URL that satisfies the search request within the browser application.

31. A computer program product according to claim 29 wherein each URL in the list of URLs transmitted with the search request is accompanied by information about a file identified thereby.

32. A computer program product according to claim 29 wherein the list of URLs stored within the client device bookmark mechanism is transmitted with the search request as a cookie.

33. A computer program product according to claim 29 wherein the list of URLs stored within the client device bookmark mechanism is transmitted with the search request as a Multipurpose Internet Mail Extension (MIME) attachment.

34. A computer program product according to claim 29 wherein the client device is configured to communicate with the server application via wireless communication signals transmitted and received to and from the computer network.

35. A computer program product according to claim 29 wherein the client device is a radiotelephone.

36. A computer program product according to claim 29 wherein the server application is a search engine.

37. A computer program product for searching the Internet for Web pages, wherein each Web page is identified by a respective Universal Resource Locator (URL), the computer program product comprising a computer usable storage medium having computer readable program code means embodied in the medium, the computer readable program code means comprising:

computer readable program code means for sending a search request from a browser application executing on a client device to a search engine executing on a server device, wherein the search engine is configured to perform a search for Web pages that satisfy search requests from client devices, wherein the browser application includes a bookmark mechanism for storing URLs of selected Web pages on the Internet, and wherein the search request is accompanied by a list of URLs stored within the browser application bookmark mechanism and at least one search term;

computer readable program code means for searching the received list of URLs stored in the client device bookmark mechanism for Web pages that satisfy the search request;

computer readable program code means for searching the Internet for Web pages that satisfy the search request; and computer readable program code means for displaying within the browser application URLS from the list of URLs stored in the client device bookmark mechanism and from Web pages that satisfy the search request.

38. A computer program product according to claim 37 wherein each URL in the list of URLs transmitted with the search request is accompanied by information about a file identified thereby.

39. A computer program product according to claim 37 wherein the list of URLs stored within the client device bookmark mechanism is transmitted with the search request as a cookie.

40. A computer program product according to claim 37 wherein the list of URLs stored within the client device bookmark mechanism is transmitted with the search request as a Multipurpose Internet Mail Extension (MIME) attachment.

41. A computer program product according to claim 37 wherein the client device is configured to communicate with the search engine via wireless communication signals transmitted and received to and from the computer network.

42. A computer program product according to claim 37 wherein the client device is a radiotelephone.

* * * * *